July 23, 1957    H. SHAW    2,800,015
GAS TURBINE MEASURING DEVICE
Filed Dec. 14, 1953
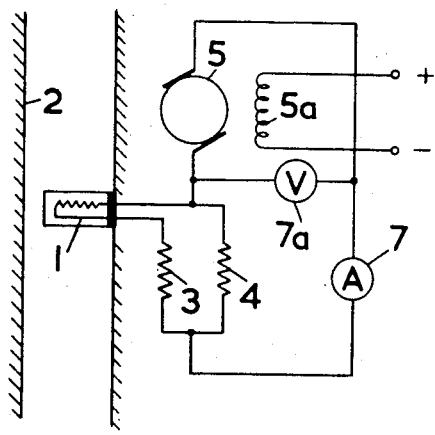
FIG. I.
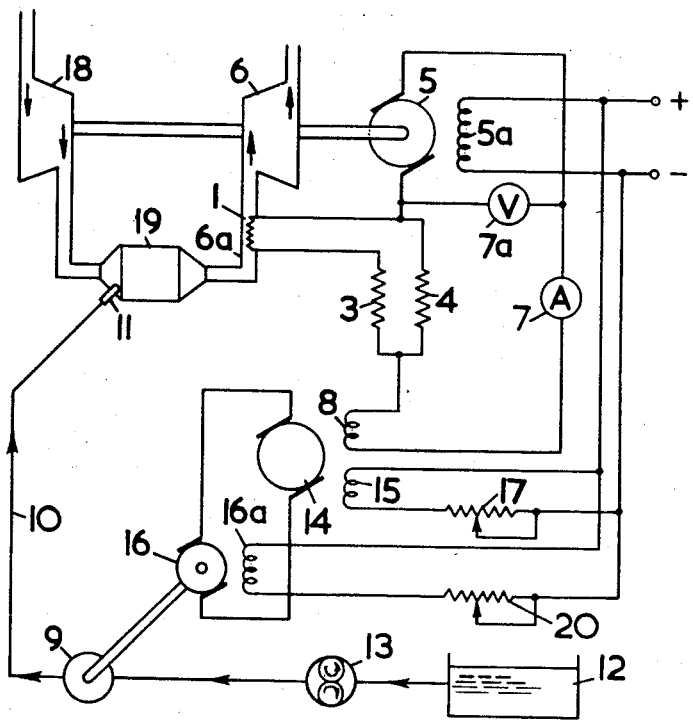
FIG. 2.
Inventor
Harry Shaw
By
Stevens, Davis, Miller & Mosher
Attorney United States Patent Office 2,800,015
Patented July 23, 1957

2,800,015
GAS TURBINE MEASURING DEVICE

Harry Shaw, Farnborough, England, assignor to Power Jets (Research and Development) Limited, London, England, a British company Application December 14, 1953, Serial No. 398,144

Claims priority, application Great Britain December 31, 1952

4 Claims. (Cl. 73—116)

This invention relates to a temperature sensitive electrical resistance combination the resistance of which varies approximately with the square root of a variable temperature over a predetermined temperature range and in particular to a device for measuring the ratio of a variable quantity to the square root of a variable temperature. Such a device may be used to actuate some protective or controlling means in accordance with this ratio.

Thus for example, in a testing gas turbine plant it may be desired to maintain—by hand or automatically—a constant operating condition by maintaining a speed of rotation N of the turbine which is not constant but which varies as some function of the absolute temperature T of the working fluid at some point in its path. In particular it is desirable to keep $$\frac{N}{\sqrt{T}}$$

constant; accordingly an indicator or control device responsive to the value of $$\frac{N}{\sqrt{T}}$$

is desirable.

Thus according to the invention there is provided a temperature sensitive electrical resistance device comprising a combination of resistances of which at least one is responsive to a variable temperature and has a resistance/temperature characteristic of which the gradient increases with increasing temperature and at least one other is invariable with the said variable temperature and is connected in parallel with the said temperature-responsive resistance, the said resistances being proportioned to provide a combined resistance automatically varying approximately proportionally to the square root of the said variable absolute temperature over a predetermined temperature range.

Furthermore, the said combination of resistances may include in series with the said temperature-responsive resistance and in parallel with the said temperature-invariable resistance, another resistance invariable with the said variable temperature.

In the application of the invention, in a gas turbine plant, to indicating or controlling equipment responsive to the ratio of the speed of rotation N of the turbine rotor to the square root of the absolute temperature T of gases in the plant, a temperature sensitive resistance combination as set forth above, with the said temperature-responsive resistance exposed to the heat of the said gases in the plant, is connected in series with a D. C. generator driven at a speed proportional to the said speed N to produce an E. M. F. proportional to N and with current responsive means which accordingly respond to $$\frac{N}{\sqrt{T}}$$

The commonly used temperature sensitive resistance element has a resistance which varies with temperature T according to a law as follows:

$R_T = A + BT + CT^2$ (higher powers of T being ignored)

Thus on a graph of resistance plotted against temperature the gradient of the characteristic increases with increase of temperature.

If the predetermined temperature range is sufficiently small, a rectilinear approximation to the above characteristic will be provided by the tangent to the characteristic at the mid-point of the temperature range. If the temperature range is wide, a better approximation will be given by a straight line drawn parallel to the said tangent and lying between the said tangent and the chord joining the two points on the characteristic corresponding to the temperature limits of the range.

On a graph of $\sqrt{T}$ plotted against T absolute, the curve passes through the origin. A parallel displacement of the above rectilinear approximation must therefore be made if it is to pass through the origin of resistance/temperature (absolute) axes. Such a displacement is represented by a fixed increase in resistance—this may be achieved in practice by placing in series with the temperature sensitive element, a resistor shielded from the variable temperature.

The curve of $\sqrt{T}$ against T however has a gradient which decreases with increasing values of T. In order to approximate to such a curve, a further resistor shielded from the varying temperature is placed in parallel with the above series combination; the characteristic of the new combination thereby tends asymptotically to the value of the shielded parallel resistance as the value of T increases.

Thus by choosing appropriate values of the shielded resistances, the characteristic of the resistance combination is made to approximate closely to the curve of $\sqrt{T}$ against T over a limited temperature range.

One example will now be given of a practical resistor combination. The temperature responsive resistance R had a characteristic as follows:

$R_T$ (in ohms) $= 90 + .438T + .00016T^2$ (T in degrees centigrade)

The selected temperature range was 0°–160° C. The gradient of the resistance/temperature (absolute) characteristic at the mean temperature of 80° C. (or 353° absolute) was .534, the value of the resistance at that temperature being 129 ohms. To displace the tangent to the characteristic at 80° C. to pass through the origin, a resistance was placed in series with the temperature sensitive resistance. For a negligible temperature range the theoretical value of such resistance was S ohms where $$\frac{129 + S}{353} = .534 \text{ i. e. } S = 58.5 \text{ ohms.}$$

To compensate for the length of the temperature range the actual figure used was 54 ohms.

By similar means of calculation and approximation, a value for the parallel resistance was determined at 180 ohms.

The following table was compiled using the above mentioned temperature responsive resistance with 54 ohms resistance connected in series with it and 180 ohms resistance connected in parallel across the combination, the total resistance of the combination at any temperature T being referred to as $Q_T$ ohms.

| T° C | 0 | 10 | 50 | 80 | 100 | 120 | 140 | 160 |
|---|---|---|---|---|---|---|---|---|
| $100 \times \sqrt{\frac{T}{T_{80}}}$ | 87.94 | 89.54 | 95.66 | 100 | 102.80 | 105.51 | 108.16 | 110.75 |
| $100 \times \sqrt{\frac{Q_T}{Q_{80}}}$ | 88.18 | 89.67 | 95.60 | 100 | 102.69 | 105.54 | 108.49 | 111.18 |
| $100 \times \sqrt{\frac{R_T}{R_{80}}}$ | 69.8 | 73.25 | 88.0 | 100 | 108.6 | 107.5 | 126.6 | 136.2 |

In the accompanying drawings—

Fig. 1 shows diagrammatically a temperature responsive resistance combination, with the temperature responsive element located in a gas duct;

Fig. 2 shows diagrammatically a temperature responsive resistance combination operatively connected in gas turbine plant control equipment.

The temperature responsive element 1, which in Fig. 1 is located in the gas duct 2, is connected in series with a resistance 3. In parallel with element 1 and resistance 3 is another resistance 4, both resistances 3 and 4 being shielded from the heat of the gases in the duct. To measure the ratio of a speed N to the square root of a variable temperature T in the gas duct, an electric generator 5 having a field winding 5a and driven at the said speed is connected across the ends of the resistance combination 1, 3, 4. An ammeter 7 for measuring the said ratio is connected in series with the generator; in addition a voltmeter 7a may be connected in parallel with the generator to indicate the value of N.

The generator 5 works over the straight line portion of its characteristic so as to generate an E. M. F. proportional to said speed N. The resistance of the combination 1, 3, 4 varies proportionally with T and therefore the current flowing in the ammeter is proportional to $$\frac{N}{\sqrt{T}}$$

The ammeter is graduated to give a direct reading of $$\frac{N}{\sqrt{T}}$$

In measuring or controlling the ratio of the speed of rotation N of a gas turbine to the square root of the temperature T of the hot gases at a point in their path, the temperature responsive resistance combination 1, 3, 4 is arranged, as shown in Fig. 2, with the temperature responsive element 1 in the path of the hot gases flowing to the turbine 6 through the turbine exhaust duct 6a. The turbine 6 forms part of a gas turbine plant in which air is compressed in a compressor 18 and fed through a combustion chamber 19 to the turbine 6. The temperature responsive resistance combination 1, 3, 4 is connected in series with a D. C. generator 5, driven by the turbine 6 and having a field winding 5a, an ammeter 7 to measure the said ratio and an electromagnetic control device 8.

The electromagnetic device 8 through which the current flows is coupled to means 9 for regulating the flow of fuel through the fuel pipe 10 to the fuel injector 11 from the tank 12 and pump 13; the means 9 being either a throttle valve in the pipe 10 or the regulator of the pump 13. The electromagnetic device 8 is, for example, one field winding on an exciter 14 and acting in opposition to a biassing field winding 15 on the exciter 14 so that any deviation from a balancing value of current in the two field windings will produce a current in the armature of a motor 16 having a field winding 16a and field rheostat 20. The motor 16 drives the said regulating means 9 until the balance is restored; the strength of the biassing field may be adjusted by a rheostat 17 so that a balance is obtained at a prescribed value of $$\frac{N}{\sqrt{T}}.$$

I claim:

1. In a gas turbine power plant, equipment responsive to the ratio of the speed of rotation N of the turbine rotor to the square root of the absolute temperature T of gases in the plant comprising in combination a resistor group of which at least one resistor is exposed to the heat of said gases and has a resistance/temperature characteristic of which the gradient increases with increasing temperature of said gases and at least one other resistor shielded from the heat of said gases, and connected in parallel with said temperature-responsive resistor, the total resistance of said group varying approximately proportionally to the square root of the said variable absolute temperature, current responsive means in series circuit with said group and means actuated by said turbine rotor for applying to the circuit an E. M. F. proportional to the said speed N.

2. In a gas turbine power plant, equipment responsive to the ratio of the speed of rotation N of the turbine rotor to the square root of the absolute temperature T of gases in the plant comprising in combination a resistor of which at least part is exposed to the heat of said gases and of which the total resistance varies approximately proportionally to the square root of the absolute temperature T of said gases, current-responsive means connected in series circuit with said resistor and means actuated by said turbine rotor for applying to said circuit an E. M. F. proportional to the speed N.

3. In a gas-turbine power plant, equipment responsive to the ratio of the speed of rotation N of the turbine rotor to the square root of the absolute temperature T of gases in the plant comprising in combination a resistor of which at least part is exposed to the heat of said gases and of which the total resistance varies approximately proportionally to the square root of the absolute temperature of said gases, a D. C. electric generator driven by said turbine rotor and having a speed-E. M. F. characteristic which is a straight line over the working speed range of the turbine plant, and current-responsive means connected in series with said resistor across the output terminals of said generator.

4. In a dynamic fluid rotary machine, equipment responsive to the ratio of the rotational speed N of the machine to the square root of the variable absolute temperature T of the fluid in the machine comprising in combination a resistor group of which at least one resistor is heated by the fluid and has a resistance/temperature characteristic of which the gradient increases with the variable temperature of the fluid and at least one other resistor unheated by the fluid and connected in parallel with the temperature responsive resistor, the total resistance of the group varying approximately proportionally to the square root of the variable absolute temperature, current responsive means in series circuit with said group and means actuated by the machine for applying to the circuit an E. M. F. proportional to the speed N.

References Cited in the file of this patent

UNITED STATES PATENTS

| | | |
|---|---|---|
| 1,573,850 | Naiman | Feb. 23, 1926 |
| 2,135,513 | Holven | Nov. 8, 1938 |
| 2,304,822 | Harrison | Dec. 15, 1942 |
| 2,595,881 | Peterson | May 6, 1952 |
| 2,632,996 | Rood | Mar. 31, 1953 |
| 2,638,784 | Cesaro et al. | May 19, 1953 |
| 2,694,928 | Jacobson | Nov. 23, 1954 |